United States Patent
Ohki et al.

(10) Patent No.: US 7,641,742 B2
(45) Date of Patent: Jan. 5, 2010

(54) ROLLING BEARING AND HEAT TREATMENT METHOD FOR STEEL

(75) Inventors: Chikara Ohki, Kuwana (JP); Kohei Fujita, Kuwana (JP)

(73) Assignee: NTN Corporation, Osaka (JP)

( * ) Notice: Subject to any disclaimer, the term of this patent is extended or adjusted under 35 U.S.C. 154(b) by 214 days.

(21) Appl. No.: 10/586,299

(22) PCT Filed: Jan. 11, 2005

(86) PCT No.: PCT/JP2005/000170
§ 371 (c)(1),
(2), (4) Date: Jul. 14, 2006

(87) PCT Pub. No.: WO2005/068862
PCT Pub. Date: Jul. 28, 2005

(65) Prior Publication Data
US 2007/0169850 A1     Jul. 26, 2007

(30) Foreign Application Priority Data
Jan. 15, 2004     (JP)     ............... 2004-007568

(51) Int. Cl.
C23C 8/00     (2006.01)
C23C 22/00     (2006.01)
(52) U.S. Cl. ...................... 148/219; 148/232
(58) Field of Classification Search ........... 148/219, 148/232
See application file for complete search history.

(56) References Cited
U.S. PATENT DOCUMENTS

| | | | |
|---|---|---|---|
| 3,954,517 A | 5/1976 | Jatczak et al. | |
| 4,162,419 A | 7/1979 | DeAngelis | |
| 4,930,909 A | 6/1990 | Murakami et al. | |
| 4,971,634 A | 11/1990 | Shibata et al. | |
| 5,085,733 A | 2/1992 | Mitamura | |
| 5,129,966 A | 7/1992 | Rao | |
| 5,137,375 A | 8/1992 | Murakami et al. | |
| 5,180,450 A | 1/1993 | Rao | |
| 5,338,377 A | 8/1994 | Mitamura et al. | |

(Continued)

FOREIGN PATENT DOCUMENTS
CN     1344932 A     4/2002

(Continued)

OTHER PUBLICATIONS

Japanese Office Action, with English Translation, issued in Japanese Patent Application No. 2002-194775, dated on Mar. 22, 2006.

(Continued)

*Primary Examiner*—Roy King
*Assistant Examiner*—Jessee R. Roe
(74) *Attorney, Agent, or Firm*—McDermott Will & Emery LLP

(57) ABSTRACT

There is provided a rolling bearing which has long life against rolling fatigue and exhibits no decrease in fracture strength and no increase in rate of dimensional change over time, even if the part size thereof is large, and which can obtain higher strength by crystal grains being further refined, if it has a size equal to or smaller than a prescribed size. The rolling bearing according to the present invention includes a race and a rolling element. At least one member of the race and the rolling element has a nitrogen-enriched layer in its surface layer, and a surface layer portion contains austenite crystal grains having a grain size number of at least 11. The member has hardenability allowing a position exhibiting HRC50 in a hardenability test method for steel to be apart from a quenched end by a distance of at least 12.7 mm (⅟₁₆ inch).

4 Claims, 5 Drawing Sheets

U.S. PATENT DOCUMENTS

| | | |
|---|---|---|
| 5,352,303 A | 10/1994 | Murakami et al. |
| 5,375,323 A | 12/1994 | Sata |
| 5,413,643 A | 5/1995 | Murakami et al. |
| 5,427,457 A | 6/1995 | Furumura et al. |
| 5,427,600 A | 6/1995 | Itoh et al. |
| 5,456,136 A | 10/1995 | Yamashita et al. |
| 5,456,766 A | 10/1995 | Beswick et al. |
| 5,595,610 A | 1/1997 | Maeda et al. |
| 5,611,250 A | 3/1997 | Narai et al. |
| 5,658,082 A | 8/1997 | Tsushima et al. |
| 5,733,667 A | 3/1998 | Nakasuji et al. |
| 5,772,956 A | 6/1998 | Hasegawa et al. |
| 5,775,280 A | 7/1998 | Schmidt et al. |
| 5,792,286 A | 8/1998 | Inoue et al. |
| 5,803,993 A | 9/1998 | Yoshida et al. |
| 5,848,846 A | 12/1998 | Sugiyama et al. |
| 5,853,249 A | 12/1998 | Maeda et al. |
| 5,944,916 A | 8/1999 | Chung |
| 5,972,130 A | 10/1999 | Underys et al. |
| 5,979,383 A | 11/1999 | Faville et al. |
| 6,012,851 A | 1/2000 | Hirakawa et al. |
| 6,086,686 A | 7/2000 | Tanaka et al. |
| 6,095,692 A | 8/2000 | Takemura |
| 6,149,734 A | 11/2000 | Isogai et al. |
| 6,158,263 A | 12/2000 | Maeda et al. |
| 6,165,289 A | 12/2000 | Matsumoto et al. |
| 6,224,688 B1 | 5/2001 | Takemura et al. |
| 6,251,198 B1 | 6/2001 | Koo et al. |
| 6,258,179 B1 | 7/2001 | Takayama et al. |
| 6,290,398 B1 | 9/2001 | Fujiwara et al. |
| 6,306,227 B2 | 10/2001 | Okayama et al. |
| 6,309,475 B1 | 10/2001 | Takayama et al. |
| 6,328,009 B1 | 12/2001 | Brothers |
| 6,342,109 B1 | 1/2002 | Takemura et al. |
| 6,423,158 B1 | 7/2002 | Maeda et al. |
| 6,440,232 B1 | 8/2002 | Takemura et al. |
| 6,447,619 B1 | 9/2002 | Takayama et al. |
| 6,488,789 B2 | 12/2002 | Tajima et al. |
| 6,532,920 B1 | 3/2003 | Sweetnam et al. |
| 6,582,532 B1 | 6/2003 | Kurebayashi et al. |
| 6,602,358 B1 | 8/2003 | Ochi et al. |
| 6,641,680 B2 | 11/2003 | Nishimori et al. |
| 6,699,335 B2 | 3/2004 | Murakami et al. |
| 6,855,217 B2 | 2/2005 | Suzuki |
| 7,147,382 B2 | 12/2006 | Suzuki et al. |
| 2002/0043111 A1 | 4/2002 | Takagi et al. |
| 2002/0082133 A1 | 6/2002 | Yoshikawa et al. |
| 2002/0088511 A1 | 7/2002 | Nakamura et al. |
| 2002/0159905 A1 | 10/2002 | Bachmann et al. |
| 2003/0037635 A1 | 2/2003 | Tsuchiyama et al. |
| 2003/0040401 A1 | 2/2003 | Okita et al. |
| 2003/0063829 A1 | 4/2003 | Tamada et al. |
| 2003/0075244 A1 | 4/2003 | Kurebayashi et al. |
| 2003/0123769 A1 | 7/2003 | Ohki |
| 2004/0079310 A1 | 4/2004 | Suzuki et al. |
| 2004/0170348 A1 | 9/2004 | Okugami et al. |
| 2004/0170761 A1 | 9/2004 | Li et al. |
| 2004/0179761 A1 | 9/2004 | Ohki et al. |
| 2004/0228561 A1 | 11/2004 | Okugami et al. |
| 2005/0045247 A1 | 3/2005 | Ohki |
| 2005/0109308 A1 | 5/2005 | Suzuki et al. |
| 2005/0205163 A1 | 9/2005 | Ohki |
| 2007/0034301 A1 | 2/2007 | Hasegawa et al. |
| 2007/0151633 A1 | 7/2007 | Ohki et al. |
| 2007/0169850 A1 | 7/2007 | Ohki et al. |

FOREIGN PATENT DOCUMENTS

| | | |
|---|---|---|
| CN | 1351694 A | 5/2002 |
| CN | 1421541 | 6/2003 |
| CN | 1421541 A | 6/2003 |
| DE | 4 204 982 A1 | 8/1993 |
| DE | 199 60 803 A1 | 6/2000 |
| DE | 102 54 635 A1 | 6/2003 |
| EP | 0 458 646 | 11/1991 |
| EP | 0 600 421 | 6/1994 |
| EP | 0 626 468 A1 | 11/1994 |
| EP | 0 723 034 A2 | 7/1996 |
| EP | 0 811 789 A1 | 12/1997 |
| EP | 0 950 723 A1 | 10/1999 |
| EP | 1 070 760 A2 | 1/2001 |
| EP | 1 158 064 A1 | 11/2001 |
| EP | 1184657 A2 | 3/2002 |
| EP | 1 273 672 A | 1/2003 |
| EP | 1 273 672 A1 | 1/2003 |
| EP | 1 411 142 A1 | 4/2004 |
| FR | 2841907 | 1/2004 |
| GB | 2 258 274 A | 2/1993 |
| JP | 48-028308 | 4/1973 |
| JP | 63-185917 | 11/1988 |
| JP | 02-125841 A | 5/1990 |
| JP | 02-190615 | 7/1990 |
| JP | 05-009584 | 1/1991 |
| JP | 05-009584 | 6/1991 |
| JP | 03-116706 | 12/1991 |
| JP | 04-254574 | 9/1992 |
| JP | 05-009584 | 1/1993 |
| JP | 05-118336 | 5/1993 |
| JP | 05-163563 A | 6/1993 |
| JP | 05-179350 | 7/1993 |
| JP | 05-263091 | 10/1993 |
| JP | 6-101424 | 4/1994 |
| JP | 06-117438 | 4/1994 |
| JP | 06-247253 | 9/1994 |
| JP | 06-286577 | 10/1994 |
| JP | 06-341441 | 12/1994 |
| JP | 07-027139 | 1/1995 |
| JP | 08-004774 | 1/1996 |
| JP | 08-049057 | 2/1996 |
| JP | 08-233070 | 9/1996 |
| JP | 08-311603 | 11/1996 |
| JP | 09-053148 | 2/1997 |
| JP | 09-176740 | 7/1997 |
| JP | 09-316601 | 12/1997 |
| JP | 09-316604 | 12/1997 |
| JP | 09-329139 | 12/1997 |
| JP | 10-030150 | 2/1998 |
| JP | 10-047334 | 2/1998 |
| JP | 10-068419 | 3/1998 |
| JP | 10-103339 | 4/1998 |
| JP | 10-110720 | 4/1998 |
| JP | 10-168515 | 6/1998 |
| JP | 10-184701 | 7/1998 |
| JP | 10-204612 | 8/1998 |
| JP | 10-231908 | 9/1998 |
| JP | 11-080897 | 3/1999 |
| JP | 11-101247 | 4/1999 |
| JP | 11-140543 | 5/1999 |
| JP | 11-303874 | 11/1999 |
| JP | 2000-038906 | 2/2000 |
| JP | 2000-038907 | 2/2000 |
| JP | 2000-54810 | 2/2000 |
| JP | 2000-129347 | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-070872 | 3/2002 |
| JP | 2002-120508 | 4/2002 |
| JP | 2002-180203 | 6/2002 |
| JP | 2002-194438 | 7/2002 |
| JP | 2002-256336 | 9/2002 |
| JP | 2002-339054 | 11/2002 |

| | | |
|---|---|---|
| JP | 2003-56315 | 2/2003 |
| JP | 2003-083337 | 3/2003 |
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| WO | WO 91/00929 | 1/1991 |
| WO | WO 02/04073 | 5/2002 |
| WO | WO 02/40730 | 5/2002 |

OTHER PUBLICATIONS

Japanese Office Action, with English Translation, issued in Japanese Patent Application No. 2002-194793, dated on Mar. 22, 2006.
Japanese Office Action, with English Translation, issued in Japanese Patent Application No. 2002-194804, dated on Mar. 20, 2007.
Japanese Office Action, with English Translation, issued in Japanese Patent Application No. 2002-194804, dated on Nov. 28, 2006.
Japanese Office Action, with English Translation, issued in Japanese Patent Application No. 2002-194921, dated on Nov. 28, 2006.
Japanese Office Action, with English Translation, issued in Japanese Patent Application No. 2002-303036, dated on Apr. 25, 2006.
Japanese Office Action, with English Translation Issued In Japanese Patent Application No. 2002-303036, dated on Oct. 24, 2006.
Japanese Office Action, with English Translation, issued in Japanese Patent Application No. 2003-209737, dated on Feb. 6, 2007.
Chinese Office Action, with English Translation, issued in Chinese Patent Application No. 200410008248.9, dated on Apr. 27, 2007.
Annual book of ASTM Standards Section Three Metals Test Methods and Analytical Procedures, 2003, vol. 03.01, ASTM, International Standards Worldwide.
JIS G 0551 "Methods of austenite grain size determination for steel", Published by Japanese Standards Association, Feb. 20, 1998.
JIS Z 2242 "Method of impact test for metallic materials", Published by Japanese Standards Association, Dec. 21, 1998.
JIS Z 2202 "Test pieces for impact test for metallic materials" Published by Japanese Standards Association, Feb. 20, 1998.
Burrier, Jr., H., "Hardenability of Carbon and Low-Alloy Steels", 2002, ASM International.
Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No. 1.
US Office Action, issued in U.S. Appl. No. 10/686,766, dated on Nov. 7, 2007.
US Office Action, issued in U.S. Appl. No. 10/787,221, dated on Oct. 26, 2007.
U.S. Appl. No. 10/585,646, filed Jul. 7, 2006.
European Search Report issued in corresponding European Patent Application No. 05703409.2-2424, dated Apr. 4, 2007.
Chinese Office Action, with English translation, issued in Chinese Patent Application No. CN 2005800023746, mailed Nov. 9, 2007.
Japanese Office Action, with English translation, issued in Japanese Patent Application No. JP 2004-053995 dated on Jun. 17, 2008.
Chinese Office Action, with English translation, issued in Chinese Patent Application No. CN 200610004620.8, mailed Sep. 5, 2008.
"Technical Means for Improvement of Service Life of a Rolling Bearing", Bearing, 2001, pp. 1,2,5 and 45, No. 5, and partial English translation.
Metallic Material Refining Technology, May 1995, p. 47, and partial English translation.
European Search Report issued in European Patent Application No. EP 04807374.6 dated Dec. 18, 2008.
Chinese Office Action, w/ English translation thereof, issued in Chinese Patent Application No. CN 200710146997.1 dated Dec. 26, 2008.
U.S. Office Action issued in U.S. Appl. No. 10/585,646, filed Jan. 16, 2009.
Chinese Office Action, with English translation, issued in Chinese Patent Application No. CN 200710146996.7, mailed Feb. 6, 2009.
Japanese Notice of Grounds of Rejection, w/ English translation thereof, issued in Japanese Patent Application No. JP 2006-139254 dated May 26, 2009.
United States Office Action issued in U.S. Appl. No. 10/787,221 dated Jul. 9, 2009.
United States Office Action issued in U.S. Appl. No. 10/795,389 dated Jul. 29, 2009.
United States Office Action issued in U.S. Appl. No. 11/501,816 dated Aug. 11, 2009.
United States Office Action issued in U.S. Appl. No. 10/897,016 dated May 27, 2009.

0.05mm 0.05mm

SUPPLY LUBRICANT OIL

US 7,641,742 B2

ROLLING BEARING AND HEAT TREATMENT METHOD FOR STEEL

RELATED APPLICATIONS

This application is the U.S. National Phase under 35 U.S.C. § 371 of International Application No. PCT/1P2005/000170, filed on Jan. 11, 2005, which in turn claims the benefit of Japanese Application No. 2004-007568, filed on Jan. 15, 2004, the disclosures of which Applications are incorporated by reference herein.

DESCRIPTION

1. Technical Field

The present invention relates to a rolling bearing used for a section that requires long life against rolling fatigue and a suppressed rate of dimensional change over time, and a heat treatment method for steel.

2. Background Art

In order to obtain a bearing part having high strength and long life against rolling fatigue, the following heat treatment method is proposed to refine crystal grains. In other words, there is disclosed a heat treatment method including the steps of carbonitriding a surface layer of a bearing part in an ambient gas to which an $NH_3$ gas is added during quench heating, cooling the bearing part to a temperature lower than a transformation point A1, and heating the bearing part again to a temperature lower than the carbonitriding temperature to quench the same, to obtain austenite crystal grains of not more than 8 μm (see Patent Document 1). In this heat treatment method, the temperature for quench heating is made lower than the carbonitriding temperature, and hence it is necessary to use for quenching a special cooling method such as one using a higher cooling rate for sufficient hardening in quenching.

Patent Document 1: Japanese Patent Laying-Open No. 2003-226918

DISCLOSURE OF THE INVENTION

Problems to be Solved by the Invention

However, even if a special method is used in quenching, there still remain a problem in which a bearing part having a large size of a wall thickness and others fails to have stable material quality, and other problems. Therefore, there has been demanded a method capable of applying the superior heat treatment method proposed above, to a bearing part having a large size.

An object of the present invention is to provide a rolling bearing that has long life against rolling fatigue and exhibits no decrease in fracture strength and no increase in rate of dimensional change over time, regardless of its part size, and that can obtain higher strength by crystal grains being further refined, if its part has a size equal to or smaller than a prescribed size, and a heat treatment method for steel.

Means for Solving the Problems

A rolling bearing according to the present invention includes a race and a rolling element, and at least one member of the race and the rolling element has a nitrogen-enriched layer in its surface layer, and a surface layer portion contains austenite crystal grains having a grain size number of at least 11. A steel forming the member has a position exhibiting HRC50 in a hardenability test (JISG0561) apart from a quenched end by a distance of at least 12.7 mm (⅜16 inch).

Another rolling bearing according to the present invention includes a race and a rolling element, and at least one member of the race and the rolling element is formed of a steel containing 0.8-1.5 wt % of carbon, 0.4-1.2 wt % of Si, 0.8-1.5 wt % of Mn, and 0.5-1.8 wt % of Cr, and has a nitrogen-enriched layer in its surface layer, and a surface layer portion contains austenite crystal grains having a grain size number of at least 11.

A heat treatment method for steel according to the present invention is used for a part formed of a steel containing 0.8-1.5 wt % of carbon, 0.4-1.2 wt % of Si, 0.8-1.5 wt % of Mn, and 0.5-1.8 wt % of Cr, and having a position exhibiting HRC50 in a hardenability test (JISG0561) apart from a quenched end by at least 12.7 mm. In this method, the part formed of the steel is carbonitrided or nitrided at 810-950° C., and subsequently cooled to a temperature range lower than a transformation point A1 of the steel product, and subsequently heated again to a quenching temperature range not lower than the transformation point A1 and lower than a temperature used for the carbonitriding or nitriding, to be quenched.

With the configuration above, it is possible to obtain a fine austenite grain diameter, and thereby stably obtain a sufficiently favorable quench-hardened structure regardless of the size of the bearing part, namely, whether the bearing part has a smaller size or a larger size, to obtain property that exhibits high strength and long life against rolling fatigue. Furthermore, the steel above has favorable hardenability, and hence can be applied to a large-sized bearing part, which is hardened insufficiently. Additionally, the steel above can provide long life against rolling fatigue and further improve fracture-resistant property and resistance to rate of dimensional change over time, not only by the hardenability, but also by a specific effect of the chemical components thereof In the above description, the hardenability test for steel (JISG0561) is made consistent with a Steel-Hardenability test by end quenching (Jominy test) in the International Standard ISO 642, and can be regarded as the same test method. The test method above requires a test piece having a size of approximately 25 mm in diameter and approximately 100 mm in length. If the test piece is formed into a shape of the rolling bearing part, for example, the size of the test piece required for the hardenability test cannot be ensured. Therefore, the hardenability test is conducted for a steel in the state of a raw material, which steel has not yet been processed into the part shape.

If a position exhibiting HRC50 in the hardenability test above is apart by less than 12.7 mm, hardenability is insufficient. Therefore, if the hardenability test is applied to the part having a large wall thickness, a central portion of the part is not hardened sufficiently and results in low hardness, which makes it impossible for the part to receive a prescribed load.

Hardenability is mainly governed by a chemical composition of the steel, and also influenced by the austenite crystal grain diameter in the hardenability test. In the present invention, the austenite grain diameter is set to a fine level of at least 11, and hence hardenability of the steel can be made to fall within a prescribed range by limiting the range of the chemical composition. The range of the chemical composition is set not only for ensuring hardenability, but also by considering an effect specific to each of the chemical components on each of the properties, as described above.

C: 0.8-1.5%

C significantly contributes to improve hardenability. A certain amount thereof is required to ensure hardness for quenching from a low temperature. The lower limit there of is set to 0.8% because it is necessary to form carbide serving as a site for austenite nucleation, the site being effective for refining crystal grains, while the upper limit thereof is set to 1.5% because an excessive amount thereof would impair workability and coarsen the carbide in carbonitriding.

Si: 0.4-1.2%

Si is necessary to ensure long life in rolling. The lower limit thereof is set to 0.4% because a content of less than 0.4% would not clearly exhibit its effect, while the upper limit thereof is set to 1.2% because an excessive amount thereof would strengthen ferrite and significantly impair workability, and at the same time, inhibit the intrusion of carbon and nitrogen in carbonitriding.

Mn: 0.8-1.5%

Mn is essential for ensuring long life in rolling, as in the case of Si. Furthermore, Mn has a significant effect on the improvement in hardenability of the steel, and hence is an element particularly indispensable for a large-sized bearing part. The lower limit thereof is set to 0.8% to secure rolling-contact fatigue life and hardenability, while the upper limit thereof is set to 1.5% because of an excessive amount thereof would impair workability and cause an excessive amount of residual austenite in quenching, which fails to ensure required hardness.

Cr: 0.5-1.8%

A certain amount of Cr is necessary. The lower limit thereof is set to 0.5% because it is necessary to form carbide serving as a site for austenite nucleation to refine crystal grains, while the upper limit thereof is set to 1.8% because an excessive amount thereof would coarsen the carbide in carbonitriding.

The concentration of nitrogen in the surface layer above can be set to 0.05-0.7 wt %. With this configuration, the surface layer can obtain sufficiently high hardness.

DESCRIPTION OF THE REFERENCE SIGNS

1: specimen, 2: driving roll, 3: backup roll, 4: cylinder, 5: upper roll, 6: lower roll, A: carbonitriding (temperature), B: quenching (temperature).

BEST MODE FOR CARRYING OUT THE INVENTION

Example

Figure 1A:
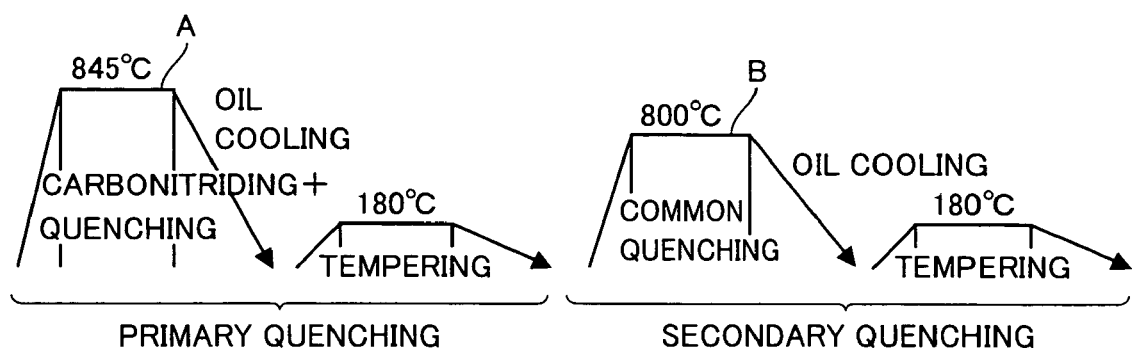
FIG. 1A is a drawing for describing a heat treatment method according to an example of the present invention, which drawings shows the method of quenching twice.
Figure 1B:
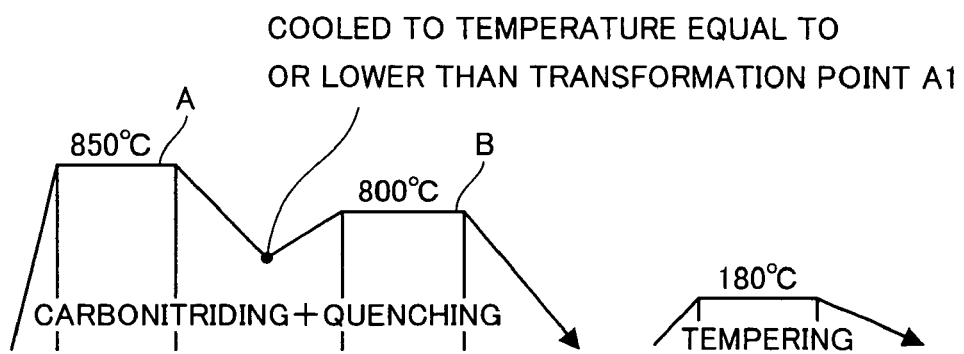
FIG. 1B is a drawing for describing a heat treatment method according to the example of the present invention, which drawings shows the method of quenching once.

An example of the present invention will now be described. A rolling bearing part evaluated in the present example was the one made of a steel containing 1.0 wt % of C, 0.5 wt % of Si, 1.0 wt % of Mn, and 1.0 wt % of Cr, the steel being subjected to a heat treatment method shown in FIG. 1A or 1B. A heat treatment method shown in FIG. 1A is a method for quenching twice, in which primary quenching and secondary quenching are performed, while a heat treatment method shown in FIG. 1B is a method including the steps of heating to a carbonitriding temperature A, cooling to a temperature lower than a transformation point A1 without quenching, and subsequently heating again to a quenching temperature B equal to or above transformation point A1 and lower than the carbonitriding temperature, for quenching. In any case, carbonitriding temperature A falls within a temperature range of 810-950° C., and the final quenching temperature B is 750-810° C. If nitriding is performed instead of carbonitriding, the same heating temperatures are used. As shown in FIGS. 1A and 1B, oil quenching is performed as quenching, and tempering is performed at 180° C. after oil cooling.

Figure 2:
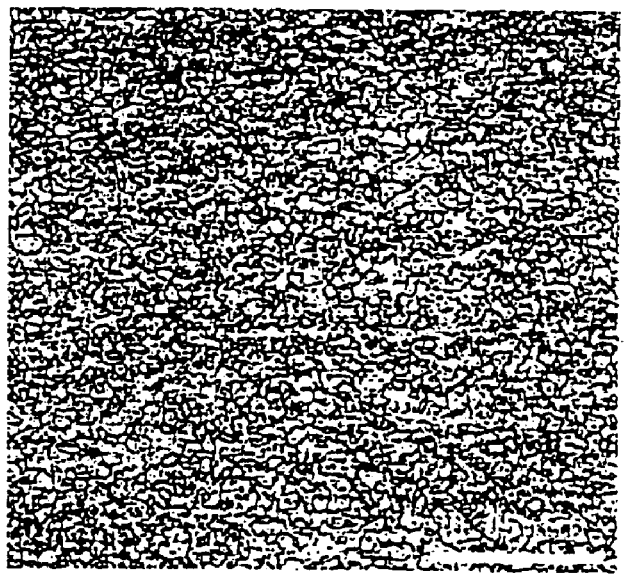
FIG. 2 is a drawing that shows a microstructure of a steel in a conventional example.
Figure 3:
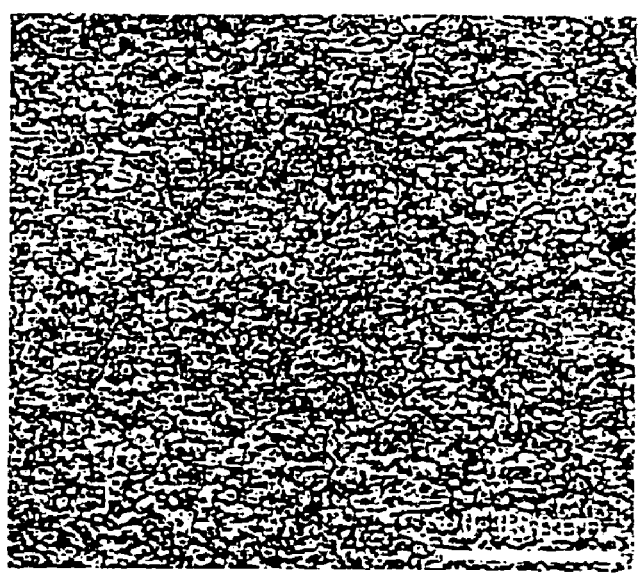
FIG. 3 is a drawing that shows a microstructure of a steel in the example of the present invention.

FIG. 2 shows a microstructure of a conventional rolling bearing part (Japanese Patent Laying-Open No. 2003-226918) to which the heat treatment method shown in FIG. 1A was applied. FIG. 3 shows a microstructure of a bearing part according to the example of the present invention, to which bearing part the heat treatment method shown in FIG. 1A was applied. Both of these microstructures had fine grains corresponding to a grain size number of 12 in accordance with an austenite crystal grain size test for steel in the JIS standard G0551, the mean grain diameter thereof being not more than 6 μm. In measurement, the number of crystal grains in a prescribed region was counted to correspond to the grain size number. The above-described JIS standard does not assume crystal grains as fine as those in the example of the present invention, and hence the formula in the JIS standard was extended for application.

In order to examine a rolling fatigue life and material property of the part fabricated with the steel according to the example of the present invention, hardness after the heat treatment, a rolling fatigue test using a cylindrical test piece, a static pressure breaking strength, and a rate of dimensional change over time were measured. As a comparative example, a part which uses the conventional steel and to which the similar heat treatment was applied was also tested. In the following, a bearing steel of type 2 (JIS SUJ2) subjected to the heat treatment in FIG. 1A is represented as a material A (a comparative example). The above-described steel, which contains 1.0% of C, 0.5% of Si, 1.0% of Mn, and 1.0% of Cr, is subjected to the heat treatment in FIG. 1A to be represented as a material B (an example of the present invention). Furthermore, material B processed by lowering the secondary quenching temperature shown in FIG. 1A to 780° C. is represented as a material BL (an example of the present invention). An austenite crystal grain size was 12 in both of materials A and B, while 13 in material BL.

1. Hardness

Figure 4:
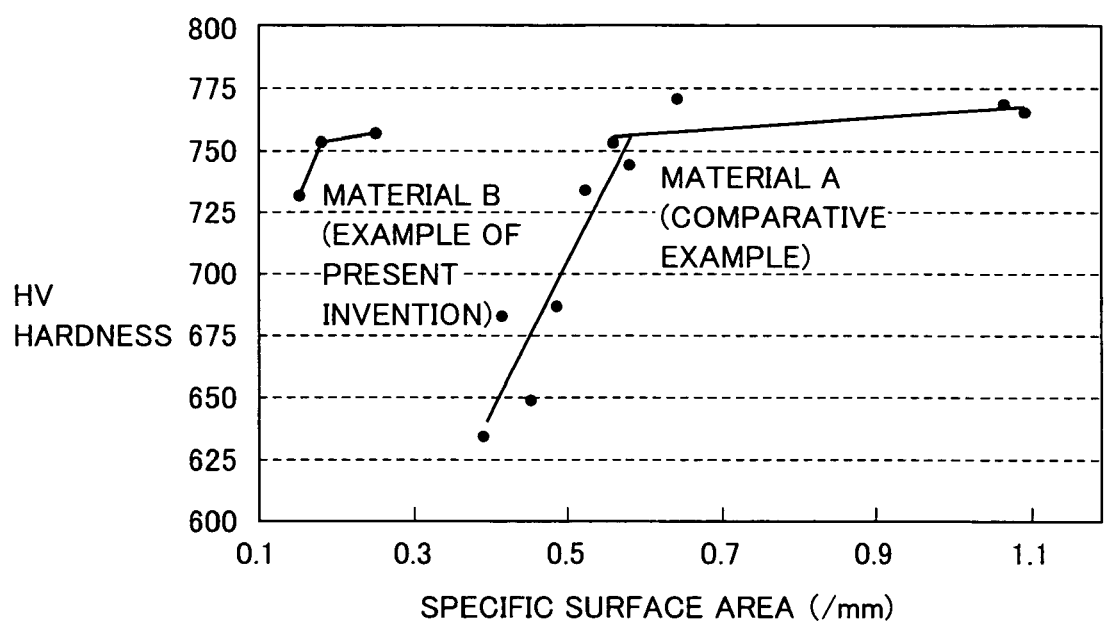
FIG. 4 is a drawing that shows a relation between a specific surface area and surface layer hardness.

FIG. 4 shows the results of hardness measurement at a position 0.05 mm deep from a surface, against each specific surface area (a surface area/a volume) of various shapes of the parts. A smaller value of the specific surface area shows a larger size of wall thickness and others, resulting in a smaller amount of heat extracted from the surface in quenching. Material B (an example of the present invention) has a specific surface area not more than the half of the specific surface area of material A (a comparative example). However, material B has high surface layer hardness in a stable manner even in the range of a specific surface area where hardness of material A (a comparative example) is lowered, or in a range of smaller specific surface area. In other words, the results were obtained reflecting that material B serving as an example of the present invention ensures higher hardenability than material A serving as a comparative example, in terms of the chemical composition.

2. Rolling Fatigue Life

Figure 5A:
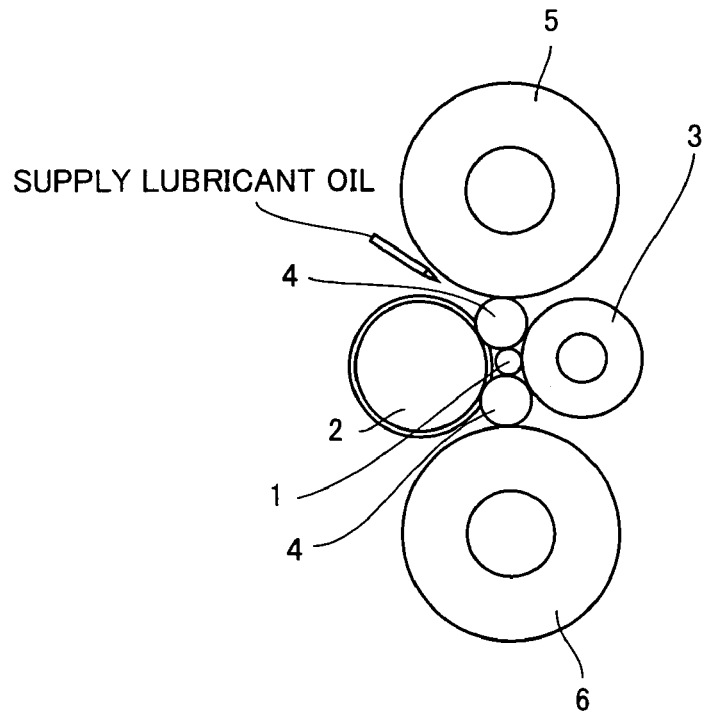
FIG. 5A is a side view of a drawing that shows a rolling fatigue testing machine.
Figure 5B:
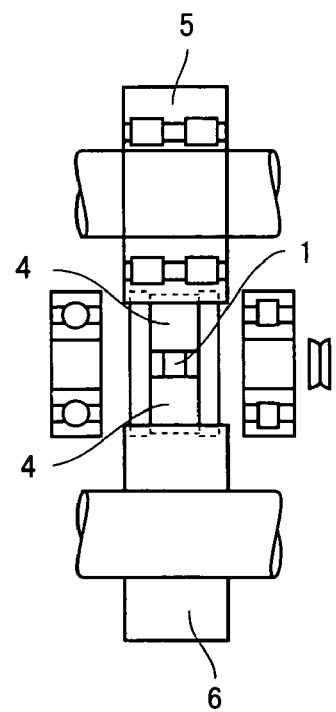
FIG. 5B is a front view of the drawing that shows the rolling fatigue testing machine.

Table 1 shows the test conditions of a rolling fatigue life test, and each of FIGS. 5A and 5B shows a schematic drawing of a rolling fatigue testing machine. FIG. 5A is a side view of the rolling fatigue testing machine, while FIG. 5B is a front view thereof. According to FIGS. 5A and 5B, a specimen 1 was sandwiched by cylinders 4 on its upper and lower sides, and cylinders 4 were pressurized by an upper roll 5 and a lower roll 6. Cylinders 4 were rotatably driven by a driving roll 2, and allowed specimen 1 to rotate by pressing themselves against the specimen. In order to stably support the rotating specimen 1, a backup roll 3 was brought into contact with the specimen 1 such that the specimen was sandwiched by the backup roll and the driving roll, to support the specimen. During the test, lubricant oil was supplied from between upper roll 5 and driving roll 2 to flow to the specimen. When the specimen was broken, an anomaly occurred in rotational movement, and the anomaly was sensed.

TABLE 1

Test Conditions

| | |
|---|---|
| Test Piece | φ12 × L12, R480 |
| Number of Tests Conducted | 10 |
| Counterpart Piece | φ20 Roller Product (SUJ2) |
| Contact Surface Pressure | 4.16 GPa |
| Loading Rate | 20400 rpm |
| Lubricant Oil | Turbine VG68: oiled by forced circulation |

Table 2 shows the test results. Material B is shown to have a longer life, namely, an $L_{10}$ life (a life during which one out of ten test pieces is broken) 1.2 times as long as that of material A. Material BL has smaller crystal grains than materials A and B, and hence has a much longer life.

TABLE 2

Test Results

| | Life (Number of Loading Cycles) | | |
|---|---|---|---|
| Material | $L_{10}$ (×10$^4$ times) | $L_{50}$ (×10$^4$ times) | $L_{10}$ ratio |
| Material A (Comparative Example) | 4290 | 8259 | 1.0 |
| Material B | 5206 | 9325 | 1.2 |
| (Example of the Present Invention) Material BL (Example of the Present Invention) | 6341 | 10520 | 1.5 |

3. Static Pressure Breaking Strength Test

Figure 6:
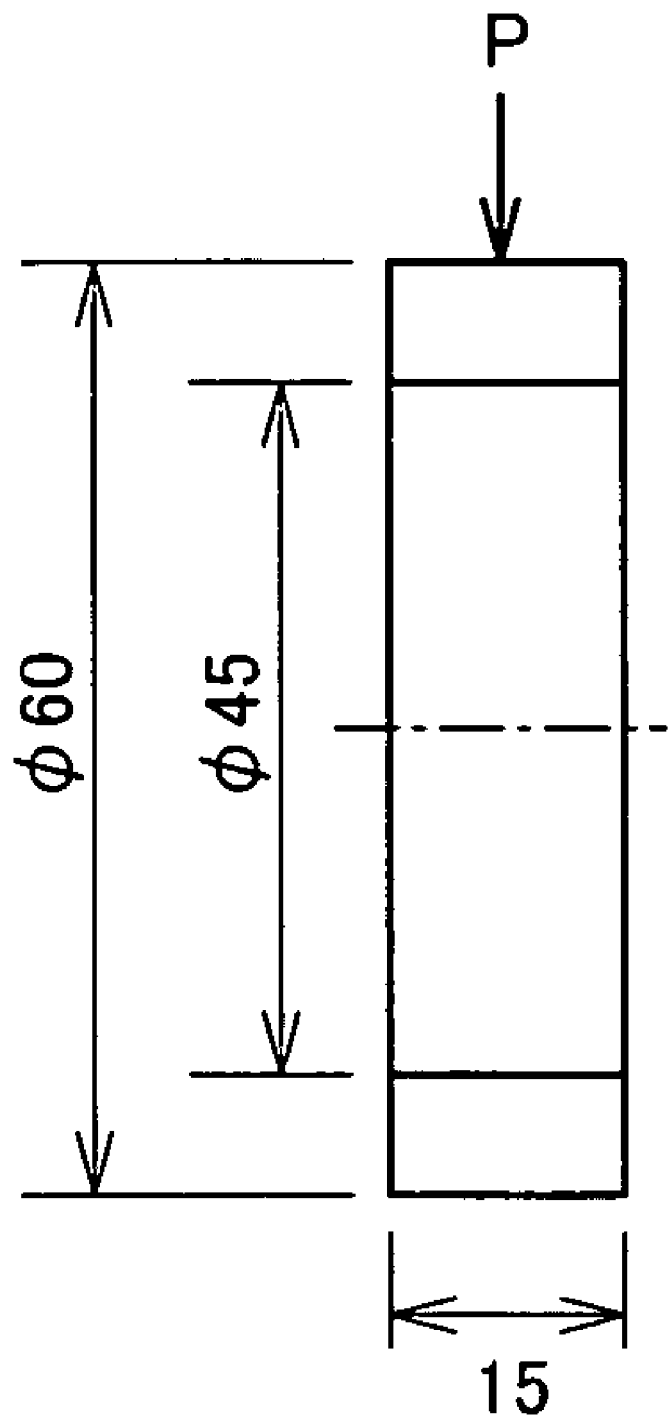
FIG. 6 is a drawing that shows a test piece used for testing static pressure breaking strength.

FIG. 6 shows a test piece for a static pressure breaking test. The static pressure breaking strength test was conducted by applying a load in a direction P to the test piece shown in FIG. 6. Table 3 shows the test results. Material B serving as an example of the present invention exhibits a level comparable to that of material A serving as a comparative example. In contrast, material BL serving as an example of the present invention has higher strength than material A.

TABLE 3

Test Results

| Steel | Number of Tests Conducted | Static Pressure Breaking Strength (kgf) | Static Pressure Breaking Strength Ratio |
|---|---|---|---|
| Material A (Comparative Example) | 5 | 3900 | 1.00 |
| Material B (Example of the Present Invention) | 5 | 3765 | 0.97 |
| Material BL (Example of the Present Invention) | 5 | 4150 | 1.04 |

4. Rate of Dimensional Change Over Time

Table 4 shows the measurement results of rate of dimensional change over time, the results being obtained at a holding temperature of 120° C., after a holding time of 500 hours. In addition to the rate of dimensional change over time, Table 4 also shows surface hardness, and an amount of residual austenite at a position 0.1 mm deep from the surface. Although the present embodiment has a larger amount of residual austenite, the rates of dimensional change over time of materials B and BL, each serving as an example of the present invention, are restricted to a rate not more than one-third of that of material A serving as a comparative example.

TABLE 4

Test Results

| Steel | Number of Tests Conducted | Surface Hardness (HRC) | Amount of Residual γ (%) | Rate of Dimensional Change (×10$^{-5}$) | Rate of Dimensional Change Rate*) |
|---|---|---|---|---|---|
| Material A (Comparative Example) | 2 | 63.2 | 15.3 | 22 | 1.0 |
| Material B (Example of the Present Invention) | 2 | 63.4 | 17.6 | 6.5 | 0.3 |

TABLE 4-continued

Test Results

| Steel | Number of Tests Conducted | Surface Hardness (HRC) | Amount of Residual γ (%) | Rate of Dimensional Change (×10⁻⁵) | Rate of Dimensional Change Rate*) |
|---|---|---|---|---|---|
| Material BL (Example of the Present Invention) | 2 | 63 | 15.6 | 5.5 | 0.3 |

*)A lower rate is superior.

5. Life Test under Lubrication with Foreign Substance Mixed Thereinto

A tapered roller bearing 30206 (JIS) was used to evaluate a rolling fatigue life under lubrication with foreign substance mixed thereinto, a prescribed amount of standard foreign substance being mixed. Table 5 shows the test conditions while Table 6 shows the test results.

TABLE 5

Rolling Fatigue Test Conditions under Lubrication with Foreign Substance Mixed Thereinto

| Load | Fr = 17.64 kN |
|---|---|
| Contact Surface Pressure | Pmax = 2.6 GPa |
| Number of Revolutions | 2000 rpm |
| Lubrication | Turbine VG56: oiled by oil bath |
| Amount of Foreign Substance | 1 g/1000 cc |
| Foreign Substance | Grain Diameter: 100-180 μm, Hardness: Hv800 |

TABLE 6

Life Test Results under Lubrication with Foreign Substance Mixed Thereinto

| Steel | $L_{10}$ life (h) | $L_{10}$ ratio |
|---|---|---|
| Material A (Comparative Example) | 119.9 | 1.0 |
| Material B (Example of the Present Invention) | 111.1 | 0.9 |
| Material BL (Example of the Present Invention) | 143.8 | 1.2 |

Material B serving as an example of the present invention has rolling fatigue life approximately 0.9 times as long as that of material A serving as a comparative example, and hence has life approximately as long as that of material A. In contrast, material BL serving as an example of the present invention has long life, namely, life approximately 1.2 times as long as that of material A serving as a comparative example.

According to the results above, the steel that contains 1.0% of C, 0.5% of Si, 1.0% of Mn, and 1.0% of Cr and is subjected to the heat treatment shown in FIG. 1A, can obtain material quality equal to that of material A serving as a comparative example, namely, the bearing steel of type 2 subjected to the heat treatment in FIG. 1A, and can satisfy both of the requirements indicating that decrease in fracture strength and rolling fatigue life should be prevented, and that the rate of dimensional change over time should be lowered. Furthermore, the results show that, if an advantage of high hardenability is utilized to lower the quenching temperature to obtain much finer crystal grains, each of the properties can be made much superior.

6. Hardenability Test

In the present example, the strength is further improved by obtaining a sufficiently hardened structure even in a part having a large size while maintaining favorable property resulting from the fine crystal grains described above, or by further refining crystal grains in a part having a small size as conventional. Therefore, samples were prototyped with their chemical components varied, to examine the relation among a quenching temperature, hardness, and crystal grains. Hardenability of the steel was expressed in distance between a position exhibiting HRC50 in the hardenability test above and a quenched end (abbreviated as a Jominy value) to obtain a scale. Table 7 shows the results thereof.

TABLE 7

| | Chemical Composition | | | | Jominy Value (Distance Between Position Exhibiting HRC50 and Quenched End) (mm) | Quenching at 800° C. | | Quenching at 780° C.° C. | | |
|---|---|---|---|---|---|---|---|---|---|---|
| No. | C | Si | Mn | Cr | | Surface Layer Hardness (HV) | Crystal Grain Size Number | Surface Layer Hardness (HV) | Crystal Grain Size Number | Note |
| 1 | 1.0 | 0.5 | 1.0 | 1.0 | 23 | 750 | 12 | 720 | 13 | Examples of the Present Invention |
| 2 | 0.8 | 0.5 | 1.1 | 0.6 | 15 | 735 | 12 | 705 | 13 | |
| 3 | 1.2 | 1.0 | 0.8 | 1.5 | 38 | 770 | 12 | 730 | 13 | |
| 4 | 1.0 | 0.5 | 0.8 | 1.0 | 17 | 740 | 11 | 710 | 13 | |
| 15 | 0.8 | 0.4 | 1.1 | 0.8 | 12.7 | 740 | 11 | 715 | 13 | |
| 16 | 1.0 | 0.8 | 0.4 | 0.8 | 10 | 670 | 11 | 610 | 13 | Comparative Examples |
| 5 | 1.0 | 0.2 | 0.3 | 1.4 | 8 | 650 | 11 | 600 | 13 | |
| 6 | 0.8 | 0.3 | 0.5 | 0.5 | 5 | 620 | 12 | 580 | 13 | |

Note
(i) A Jominy value is a value estimated from chemical components (calculated with a crystal grain size number of 10).
(ii) Surface layer hardness is a value actually measured in a test piece having a wall thickness of 15 mm (a ring having an outside diameter of 85 mm, an inside diameter of 55 mm, a width of 30).

Referring to Table 7, if a position exhibiting HRC50 is apart from a quenched end by at least 12.7 mm (⁸⁄₁₆ inch) as in the specimens 1-4, and 15 in the example of the present invention, even a part having a large wall thickness can sufficiently be hardened in quenching, and hence obtain long life in a stable manner. Furthermore, in a part having a size equal to or smaller than a prescribed size, crystal grains can further be refined by being quenched at a lower quenching temperature. In contrast, specimens 5, 6 and 16 in the comparative example cannot sufficiently be hardened, and hence their surface hardness cannot be made sufficiently high.

For the purpose of improving hardenability while maintaining fine crystal grains, the steel according to the present invention has hardenability that allows a position exhibiting HRC50 in the above-described hardenability test method (JISG0561) (Jominy value) to be apart from a quenched end by at least 12.7 mm (⁸⁄₁₆ inch), and a chemical composition that assures such hardenability, within the above-described range of chemical components. When the steel having such high hardenability is used, the quenching rate and the quenching temperature can further be lowered not only for the part having a large wall thickness, but also for the part having a small wall thickness. Accordingly, quality of the bearing such as accuracy of the bearing and rolling life can stably be improved in that quenching distortion is prevented and that residual austenite is increased.

The embodiment of the present invention, which includes the examples of the present invention, will now be described sequentially.

As to the part formed of the steel according to the present invention, a value of specific surface area represented as a surface area/a volume can be set to no more than 0.6. With this configuration, the present invention can be applied to the block-type part having a sufficiently large size, to ensure long rolling fatigue life and high strength.

In the heat treatment method for the steel described above, a quenching temperature range, which is equal to or higher than transformation point A1 and lower than a carbonitriding or nitriding temperature, can be set to 750-810° C.

With this configuration, a super fine austenite grain diameter can be obtained while favorable hardenability is ensured, resulting in that long rolling fatigue life and high strength can be obtained.

The heat treatment method described above may be applied to any steel parts and not restricted to a bearing part, as long as the steel has a carbonitrided layer or a nitrogen-enriched layer in its surface layer. Furthermore, the nitrogen-enriched layer may be a surface layer formed by carbonitriding, as long as the surface layer is enriched with nitrogen, whether or not carbon coexists therewith.

The quenching temperature in the above-described quenching does not cause quenching from a completely austenitized state, and may cause cementite to be left partially. This quenching temperature, however, provides an almost completely austenitized state, and hence a microstructure resulting from the quenching is hardened as sufficiently as a structure quenched from a completely austenitized state. It is possible to etch the microstructure to reveal austenite crystal grains, to thereby measure the grain size thereof. The austenite crystal grains according to the present invention should be interpreted in view of the meaning of the present invention.

It should be understood that the embodiment disclosed here is by way of illustration in all aspects and is not to be taken by way of limitation. The scope of the present invention is indicated not by the description above, but by the scope of the claims, and all the modifications in the scope of the claims and the equivalent meanings thereof are intended to be embraced.

INDUSTRIAL APPLICABILITY

With the rolling bearing and the heat treatment method for steel according to the present invention, a product can be hardened with fine crystal grains maintained, even if the product has a large size of a wall thickness and others. Furthermore, if the size of the product is equal to or smaller than a prescribed size, the quenching temperature can be lowered to further refine the crystal grains. It is thereby possible to significantly increase the durability of steel parts, such as a rolling bearing, having a nitrogen-enriched layer, and thus the present invention is expected to be widely used for many steel parts such as ones associated with vehicle parts and others.

The invention claimed is:

1. A heat treatment method for steel, comprising the steps of:
    carbonitriding or nitriding at 810-950° C. a part formed of a steel containing 0.8-1.5 wt % of carbon, 0.4-1.2 wt % of Si, 0.8-1.5 wt % of Mn, and 0.5-1.8 wt % of Cr, the steel having a position exhibiting HRC50 in a hardenability test (JISG0561) apart from a quenched end by at least 12.7 mm;
    subsequently cooling the part to a temperature range lower than a transformation point A1 of said steel to provide a quenched part;
    tempering the quenched part a first time;
    subsequently heating the part again after tempering to a quenching temperature range not lower than the transformation point A1 and lower than a temperature used for said carbonitriding or nitriding, to quench the part a second time, and
    tempering the part a second time after quenching a second time.

2. The heat treatment method for steel according to claim 1, wherein the quenching temperature range not lower than said transformation point A1 and lower than the temperature used for said carbonitriding or nitriding is 750-810° C.

3. The heat treatment method for steel according to claim 1, wherein the temperature used for tempering the quenched part a first time is 180° C.

4. The heat treatment method for steel according to claim 1, wherein the temperature used for tempering the part a second time is 180° C.

* * * * *